(12) United States Patent
Bernardi

(10) Patent No.: US 11,473,952 B2
(45) Date of Patent: Oct. 18, 2022

(54) METHOD AND SENSOR FOR DETECTING FLOW RATES IN CORROSIVE LIQUID

(71) Applicant: William Peter Bernardi, Ligonier, PA (US)

(72) Inventor: William Peter Bernardi, Ligonier, PA (US)

( * ) Notice: Subject to any disclaimer, the term of this patent is extended or adjusted under 35 U.S.C. 154(b) by 64 days.

(21) Appl. No.: 17/220,165

(22) Filed: Apr. 1, 2021

(65) Prior Publication Data

US 2021/0310841 A1    Oct. 7, 2021

Related U.S. Application Data

(60) Provisional application No. 63/004,686, filed on Apr. 3, 2020.

(51) Int. Cl.
G01F 1/69 (2006.01)
G01F 1/696 (2006.01)

(52) U.S. Cl.
CPC ............... *G01F 1/696* (2013.01); *G01F 1/69* (2013.01)

(58) Field of Classification Search
CPC ............ G01F 1/696; G01F 1/69; G01F 15/18
See application file for complete search history.

(56) References Cited

U.S. PATENT DOCUMENTS

| | | | |
|---|---|---|---|
| 3,366,942 A | 1/1968 | Deane | |
| 3,500,686 A | 3/1970 | Bell, III | |
| 4,028,689 A * | 6/1977 | Schopp | G01F 1/684 73/204.22 |
| 4,135,396 A | 1/1979 | Stanke et al. | |
| 5,299,594 A | 4/1994 | Lord et al. | |
| 5,446,531 A * | 8/1995 | Boyer | A47L 15/4287 68/12.02 |
| 5,471,022 A | 11/1995 | Kiss et al. | |
| 5,923,433 A * | 7/1999 | Giuffre | G01N 21/534 356/440 |
| 6,318,168 B1 | 11/2001 | Chidley et al. | |
| 6,981,650 B2 | 1/2006 | Uy et al. | |
| 7,333,899 B2 | 2/2008 | Zimmermann et al. | |
| 8,151,580 B1 * | 4/2012 | Cantolino | H01H 29/04 62/150 |
| 9,157,781 B2 * | 10/2015 | Sella | G01F 1/698 |
| 2002/0073772 A1 | 6/2002 | Bonne et al. | |
| 2018/0052086 A1 * | 2/2018 | Murphy | G01N 11/16 |

* cited by examiner

*Primary Examiner* — Francis C Gray
(74) *Attorney, Agent, or Firm* — The Webb Law Firm

(57) ABSTRACT

Provided are flow sensor assemblies for determining a flow rate of a liquid that include an O-ring support, a printed circuit board (PCB) positioned in the O-ring support, a plurality of couplings of a male sensor pin and a female sensor pin, a plurality of thermistors associated with the plurality of couplings, wherein each thermistor of the plurality of thermistors are positioned on the PCB and are adjacent to a respective coupling of the plurality of couplings, and an over-molding material that holds the PCB in place with regard to the O-ring support. Methods are also provided.

20 Claims, 11 Drawing Sheets

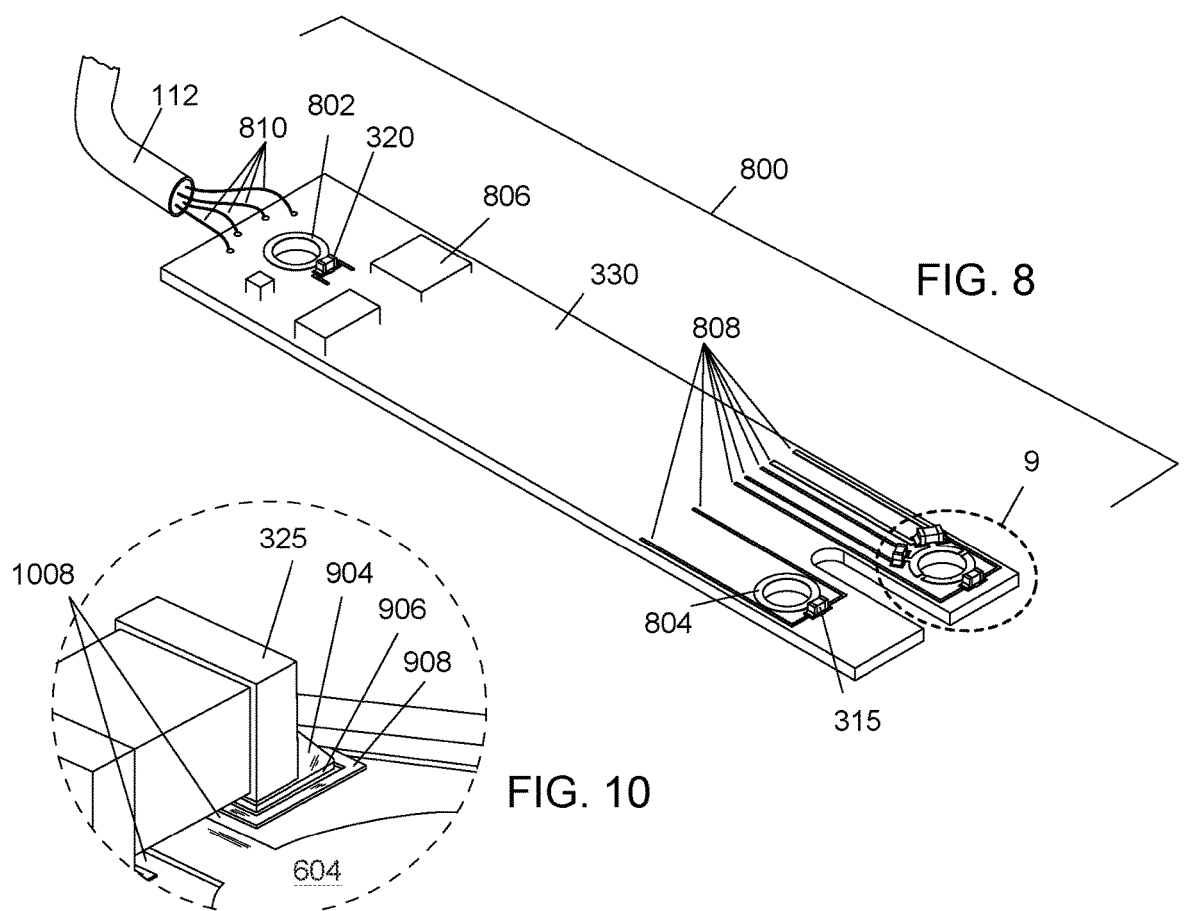
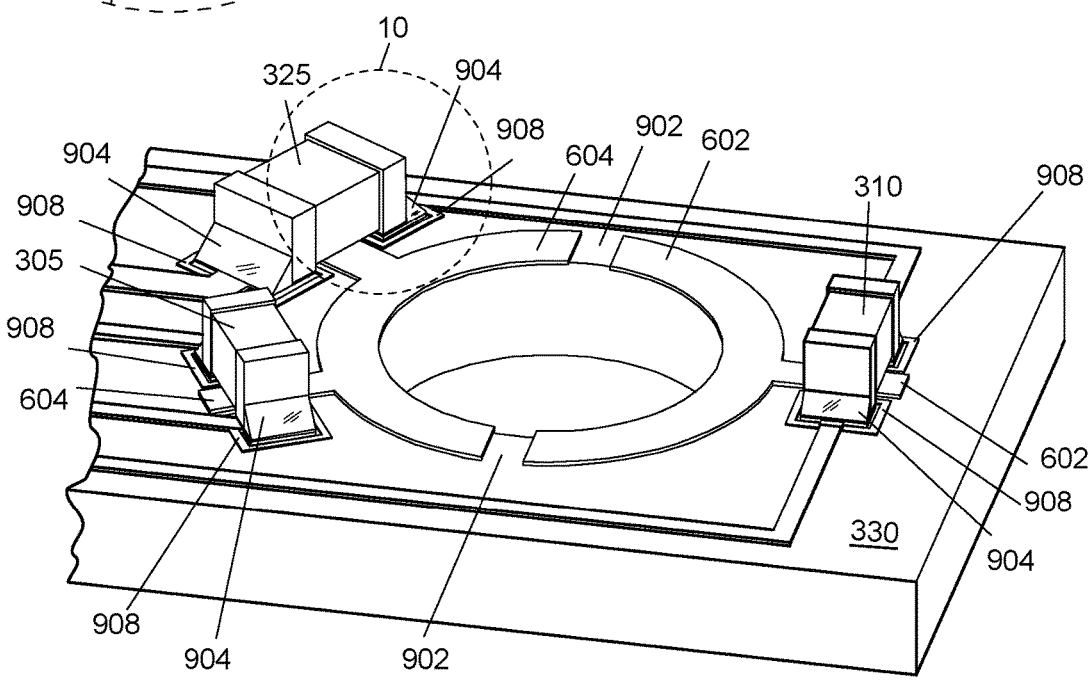

METHOD AND SENSOR FOR DETECTING FLOW RATES IN CORROSIVE LIQUID

CROSS-REFERENCE TO RELATED APPLICATION

The present application claims priority to U.S. Provisional Patent Application No. 63/004,686, filed on Apr. 3, 2020, the disclosure of which is hereby incorporated by reference in its entirety.

BACKGROUND

1. Field

This disclosure relates generally to sensors and, in some non-limiting embodiments or aspects, to systems, methods, and computer program products for sensors used to determine flow rates of corrosive liquids.

2. Technical Considerations

A heat pump may refer to a device used to heat and/or cool a location by transferring thermal energy from a cooler space to a warmer space using a refrigeration cycle that takes place in the opposite direction to which heat transfer would take place without application of external power. Types of heat pumps may include air source heat pumps, ground source heat pumps, water source heat pumps, and exhaust air heat pumps. In a water heating application, a heat pump may be used to heat or preheat water for a swimming pool (e.g., a swimming pool heat pump). In some instances, heat is extracted from outdoor air and transferred to an indoor water tank.

SUMMARY

Accordingly, disclosed are devices, such as sensors, systems, methods, and computer program products for determining a flow rate of a liquid that overcomes disadvantages of the prior art.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and the claims, the singular form of "a," "an," and "the" include plural referents unless the context clearly dictates otherwise.

BRIEF DESCRIPTION OF THE DRAWINGS

FIG. 8 is a diagram of a flow sensor printed circuit board (PCB) assembly of the present disclosure;

FIG. 9 is an enlarged view of a section of the flow sensor PCB assembly of FIG. 8;

FIG. 10 is an enlarged view of the section of the flow sensor PCB assembly of FIG. 9;

DESCRIPTION

Figure 1:
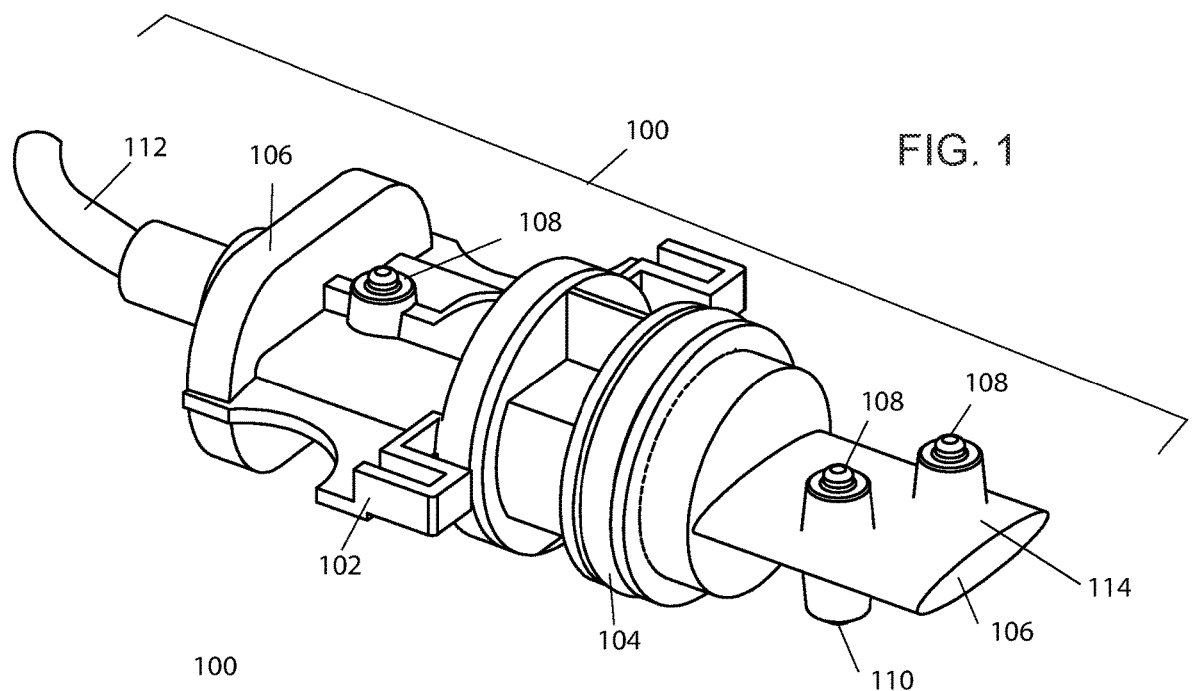
FIG. 1 is a diagram of a flow sensor assembly of the present disclosure.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects of the embodiments disclosed herein are not to be considered as limiting unless otherwise indicated.

No aspect, component, element, structure, act, step, function, instruction, and/or the like used herein should be construed as critical or essential unless explicitly described as such. In addition, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise. The phase "based on" may also mean "in response to" where appropriate.

In applications of heating systems in a swimming pool or a spa, water flow must be verified before the heat source of the heating system is activated (e.g., turned on, energized, ignited, etc.) and water flow must be monitored during heating to prevent overheating and damage to a compressor and/or a heat exchanger of the heating system. This has historically been accomplished by an adjustable water pressure switch, which is set to detect back pressure from the pool pump as water flows through the heat exchanger. In order to access the water pressure in the pool piping, a barb fitting is usually installed in the heat exchanger, and a plastic sensing hose is run from the piping to the pressure switch.

This adjustable water pressure switch has an adjustable spring loaded diaphragm, which pushes on a micro-switch to open based on flow pressure from the pool pump or close when the pool pump deactivates (e.g., shuts off). The adjustment range of the water pressure switch is only in the positive direction and usually limited to a range of 1-5 psi. The adjustment compensates for static back pressure that may be encountered where the heating system is several feet below a water level of the pool or spa or where plumbing return lines of the piping of the pool or spa create static back pressure.

However, there may be situations where an adjustable water pressure switch fails to detect low water flow or no water flow. First, there is pump deadheading, which may refer to a situation where a blockage occurs in the piping of the pool or spa downstream of the adjustable water pressure switch and water flow is reduced to near zero while back pressure increases as the pool pump of the pool or spa continues to run. The pressure switch may continue to be closed based on pressure, but there may be no water flow. Second, a blockage in a hose from the heat exchanger could retain pressure after the pool pump deactivates and the pressure may slowly bleed back into the pool piping causing a delay in deactivation of the heating system. Third, a zero setting on the adjustable water pressure switch, combined with a clogged filter upstream of the heating system, may reduce water flow below a minimum level required to remove enough heat from the heat exchanger but still create enough back pressure to cause the water pressure switch to trip (e.g., switch off). In such a situation, the heat exchanger may overheat and trip one of the limit switches in a gas heater or the high refrigerant pressure switch in a heat pump, which may lead to on off cycling of a compressor and eventually reduce the life of the compressor. Fourth, when insects or other pests, or other debris is inserted between the diaphragm and the micro-switch of the adjustable water pressure switch, even a small amount of back-pressure may cause the water pressure switch to trip.

The above situations are examples of low water flow problems within a heating system that may be caused by an adjustable water pressure switch and which may result in the heating system remaining activate when the heating system should be deactivated.

In addition, the following examples are of situations where an adjustable water pressure switch might not turn on when there is adequate water flow in the heating system, which may result in the heating system deactivating when the heating system should be activated. First, a clogged sensing hose may prevent a pressure signal from reaching the adjustable water pressure switch. Second, moving parts in the switch mechanisms of adjustable water pressure switch may fail. Accordingly, many problems are encountered with the use of the adjustable water pressure switch.

In addition, other types of flow switches, such as a paddle wheel switch, a magnet/reed switch, and/or a turbine flow sensor all have moving parts and are subject to wear and corrosion when used in heating systems for pools or spas. Further, thermal dispersion, ultrasonic, and vortex shedding flow sensors have all remained too complex and costly for use in the cost sensitive pool heater market. In addition, many of these sensors require power sources and electronic interfaces that further increase cost and difficulty in adapting them to pool heater controllers.

There is a need for a true, reliable, and quick responding flow sensing safety switch that represents an improvement with few moving parts, however, this has remained unjustified by higher costs required to withstand the relatively high concentrations of chlorine and other corrosive chemicals used in the water for a pool or spa.

Provided are improved devices, systems, methods, and computer program products for determining a flow rate of a liquid. Embodiments of the present disclosure may include a flow sensor assembly for determining a flow rate of a liquid that includes an O-ring support, a printed circuit board (PCB) positioned in the O-ring support, a plurality of couplings of a male sensor pin and a female sensor pin, a plurality of thermistors associated with the plurality of couplings, wherein each thermistor of the plurality of thermistors are positioned on the PCB and are adjacent to a respective coupling of the plurality of couplings, and an over-molding material that holds the PCB in place with regard to the O-ring support. In some non-limiting embodiments, each coupling comprises a male sensor pin made of titanium and a female sensor pin made of titanium. In some non-limiting embodiments, the male sensor pin and the female sensor pin are configured to be coupled together based on a threaded connection. In some non-limiting embodiments, the flow sensor assembly further comprises a heating resistor positioned on the PCB, and the heating resistor is soldered in position on the PCB and an amount of solder attaches the heating resistor to a plurality of solder pads that are positioned on the PCB. In some non-limiting embodiments, the flow sensor assembly further comprises a processor positioned on the PCB. In some non-limiting embodiments, the flow sensor assembly further comprises a cable comprising a plurality of wires attached to the PCB, wherein the cable is configured to provide a signal transmission path from the processor to a signal processing device. In some non-limiting embodiments, the flow sensor assembly further comprises a plurality of electrical traces positioned on the PCB, wherein the plurality of electrical traces are formed from copper. In some non-limiting embodiments, the plurality of thermistors comprises a water temperature response thermistor and a self-heating thermistor and the plurality of electrical traces comprises a water temperature response electrical trace associated with the response thermistor and a heating electrical trace associated with the self-heating thermistor. In some non-limiting embodiments, a gap is formed between the water temperature response electrical trace associated with the water temperature response thermistor and the heating electrical trace associated with the self-heating thermistor on the PCB, and the gap is configured to prevent direct thermal conduction between the self-heating thermistor and the water temperature response thermistor.

In some non-limiting embodiments, a flow sensor assembly for determining flow rate of a liquid may include an O-ring support, a PCB positioned in the O-ring support, a heating resistor positioned on the PCB, a plurality of couplings of a male sensor pin and a female sensor pin, a plurality of thermistors associated with the plurality of couplings, wherein each thermistor of the plurality of thermistors are positioned on the PCB and are adjacent to a respective coupling of the plurality of couplings, and where the plurality of thermistors comprises a self-heating thermistor, a reference thermistor, and a water temperature response thermistor, and a processor positioned on the PCB, where the processor is programmed or configured to monitor a resistance of the reference thermistor, the self-heating thermistor, and the water temperature response thermistor, and run a voltage stabilization routine with regard to the self-heating thermistor. In some non-limiting embodiments, the processor is further programmed or configured to compare the resistance of the self-heating thermistor and the resistance of the water temperature response thermistor to the resistance of the reference thermistor associated with static air and determine whether the resistance of the self-heating thermistor and the resistance of the water temperature response thermistor are less than the resistance of the reference thermistor associated with static air. In some non-limiting embodiments, the processor is programmed or configured to output a signal associated with a lack of liquid based on determining that the resistance of the self-heating thermistor and the resistance of the water temperature response thermistor are less than the resistance of the reference thermistor associated with static air. In some non-limiting embodiments, the processor is further programmed or configured to compare the resistance of the self-heating thermistor and the resistance of the water temperature response thermistor to the resistance of the reference thermistor associated with a static liquid and determine whether the resistance of the self-heating thermistor and the resistance of the water temperature response thermistor are less than the resistance of the reference thermistor associated with the static liquid. In some non-limiting embodiments, the processor is further programmed or configured to output a signal associated with a lack of flow based on determining that the resistance of the self-heating thermistor and the resistance of the water temperature response thermistor are less than the resistance of the reference thermistor associated with the static liquid. In some non-limiting embodiments, the processor is further programmed or configured to compare the resistance of the self-heating thermistor and the resistance of the water temperature response thermistor to the resistance of the reference thermistor associated with a maximum flow rate of a liquid and determine whether the resistance of the self-heating thermistor and the resistance of the water temperature response thermistor are greater than the resistance of the reference thermistor associated with the maximum flow rate of a liquid. In some non-limiting embodiments, the processor is further programmed or configured to output a signal associated with a flow rate based on determining that the resistance of the self-heating thermistor and the resistance of the water temperature response thermistor are not greater than the resistance of the reference thermistor associated with the maximum flow rate of a liquid. In some non-limiting embodiments, the flow sensor assembly further comprises an over-molding material that holds the PCB in place with regard to the O-ring support. In some non-limiting embodiments, the flow sensor assembly further comprises a plurality of electrical traces positioned on the PCB, wherein the plurality of electrical traces are formed from copper. In some non-limiting embodiments, the plurality of electrical traces comprises a water temperature response electrical trace associated with the water temperature response thermistor and a heating electrical trace associated with the self-heating thermistor. In some non-limiting embodiments, a gap is formed between the water temperature response electrical trace associated with the water temperature response thermistor and the heating electrical trace associated with the self-heating thermistor on the PCB, wherein the gap is configured to prevent direct thermal conduction between the self-heating thermistor and the water temperature response thermistor.

In this way, embodiments or aspects of the present disclosure allow for a flow sensor assembly for determining a flow rate that is inexpensive, provides the ability to accurately determine flow rate of a liquid, and provide corrosion resistance to liquids that include high concentrations of chlorine and other corrosive chemicals.

Referring now to FIGS. 1-3 and 5, FIGS. 1-3 and 5 are diagrams of flow sensor assembly 100. As shown in FIGS. 1-3 and 5, flow sensor assembly 100 may include O-ring support 102, O-ring 104, sensor pins 108, 110, and cable 112. In some non-limiting embodiments, sensor pins 108 (e.g., male sensor pins 108) may be configured as male connectors and sensor pins 110 (e.g., female sensor pins) may be configured as female connectors. In some non-limiting embodiments, male sensor pins 108 and/or female sensor pins 110 may be constructed from titanium. In this way, male sensor pins 108 and/or female sensor pins 110 may be able to avoid corrosion when exposed to a corrosive chemical, such as chlorine. In some non-limiting embodiments, male sensor pins 108 and female sensor pins 110 may provide a path for the transfer of heat between a liquid in thermal contact with male sensor pins 108 and female sensor pins 110 and embedded surface mount thermistors of flow sensor assembly 100 (e.g., thermistors 305, 310, 315).

As shown in FIG. 1, O-ring support 102, male sensor pins 108, female sensor pins 110, and cable 112 may be at least partially encapsulated in over-molding material 106. In some non-limiting embodiments, over-molding material 106 may include a flexible polymer, such as plastic and/or rubber, and/or other appropriate material. For example, over-molding material 106 may include flexible polyvinyl chloride (PVC). In some non-limiting embodiments, over-molding material 106 may be applied based on a low pressure injection molding process. In some non-limiting embodiments, one or more sets of male sensor pin 108 and female sensor pin 110 may be held in position as part of flow sensor assembly 100 by over-molding material 106. For example, male sensor pin 108 and corresponding female sensor pin 110 may be positioned in a section of O-ring support 102 as part of flow sensor assembly 100 and held in place by over-molding material 106. In some non-limiting embodiments, over-molding material 106 may hold PCB 330 in place with regard to (e.g., in relation to) O-ring support 102.

In some non-limiting embodiments, O-ring 104 is positioned in a groove of O-ring support 102. In some non-limiting embodiments, O-ring 24 is sized and configured to seal flow sensor assembly 100 in a fluid chamber of a heat exchanger of a heating system and/or piping (e.g., a section of PVC pipe) of a pool, spa, or other application for water flow. In some non-limiting embodiments, cable 112 may provide power (e.g., direct current (DC) power, alternating current power, etc.) to a circuit board and provide a path to transmit a signal to a control device, such as a processor (e.g., processor 806 shown in FIG. 8), connected to cable 112.

Figure 2:
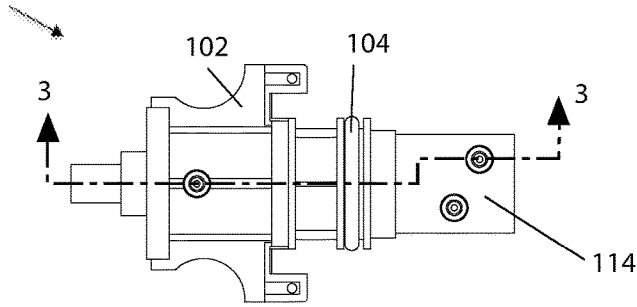
FIG. 2 is a top view of the flow sensor assembly of FIG. 1.
Figure 3:
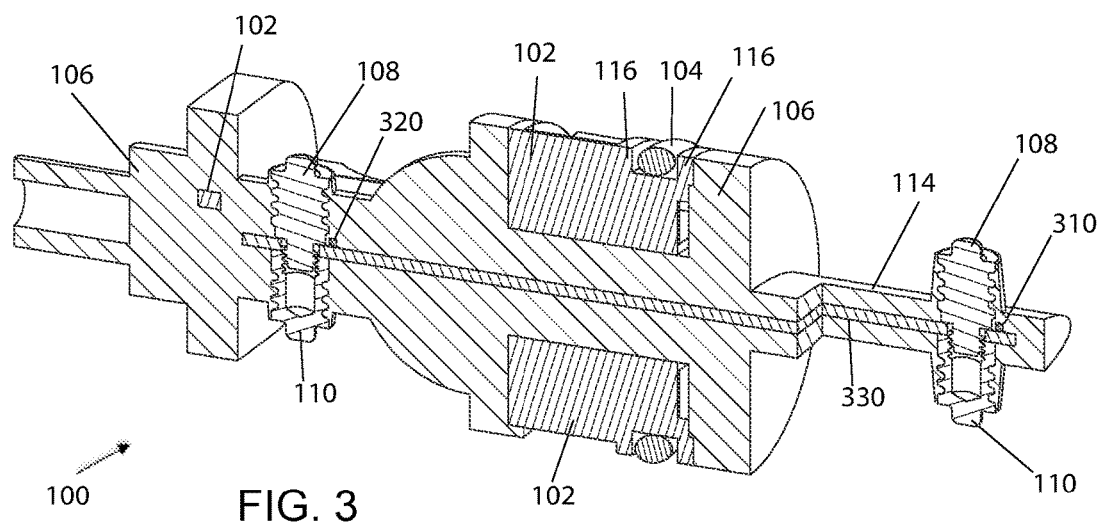
FIG. 3 is a cross-sectional view of the flow sensor assembly of FIG. 1.

Referring now to FIG. 3, FIG. 3 is a cross-sectional view of flow sensor assembly 100 along line 3-3 of FIG. 2. As shown in FIG. 3, over-molding material 106 may be positioned over O-ring support 102 and other components of flow sensor assembly 100. In some non-limiting embodiments, male sensor pins 108 may be assembled in apertures (e.g., holes, cutouts, etc.) in PCB 330 and attached (e.g., screwed into) to female sensor pins 110. In this way, PCB 330 is held in place (e.g., captured) and placed into intimate contact with bare copper electrical traces (e.g., shown in FIGS. 8-11) on PCB 330 that run around apertures in PCB 330 and also run under a surface mount thermistor (e.g., air temperature thermistor 320 shown in FIG. 8) that measure air temperature and a water temperature response thermistor (e.g., water temperature response thermistor 310 shown in FIG. 9). In some non-limiting embodiments, male sensor pin 108 and female sensor pin 110 may be positioned on PCB 330 based on coupling male sensor pin 108 and corresponding female sensor pin 110 together via an attachment mechanism of male sensor pin 108 and/or female sensor pin 110, such as a friction fit, a threaded fit, and/or the like.

As further shown in FIG. 3, O-ring 104 is positioned in a groove of O-ring support 102 formed by vertical ribs 116 of O-ring support 102. Vertical rib 116 of the groove of O-ring support 102 is shown fully-sectioned down to over-molding material 106. In some non-limiting embodiments, over-molding material 106 may pass through a channel (e.g., channel 412 shown in FIG. 4) formed into the O-ring support 102 and out to cover front wetted portion 114 (e.g., a portion that is to come into contact with a liquid) of flow sensor assembly 100. In some non-limiting embodiments, front wetted portion 114 may include one or more couplings of male sensor pin 108 and female sensor pin 110, where a coupling is made from a set of male sensor pin 108 and corresponding female sensor pin 110. In some non-limiting embodiments, a plurality of thermistors may be associated with a plurality of couplings of male sensor pin 108 and female sensor pin 110, such that each thermistor of the plurality of thermistors are positioned on PCB 330 and are adjacent to a respective coupling of the plurality of couplings.

Figure 4:
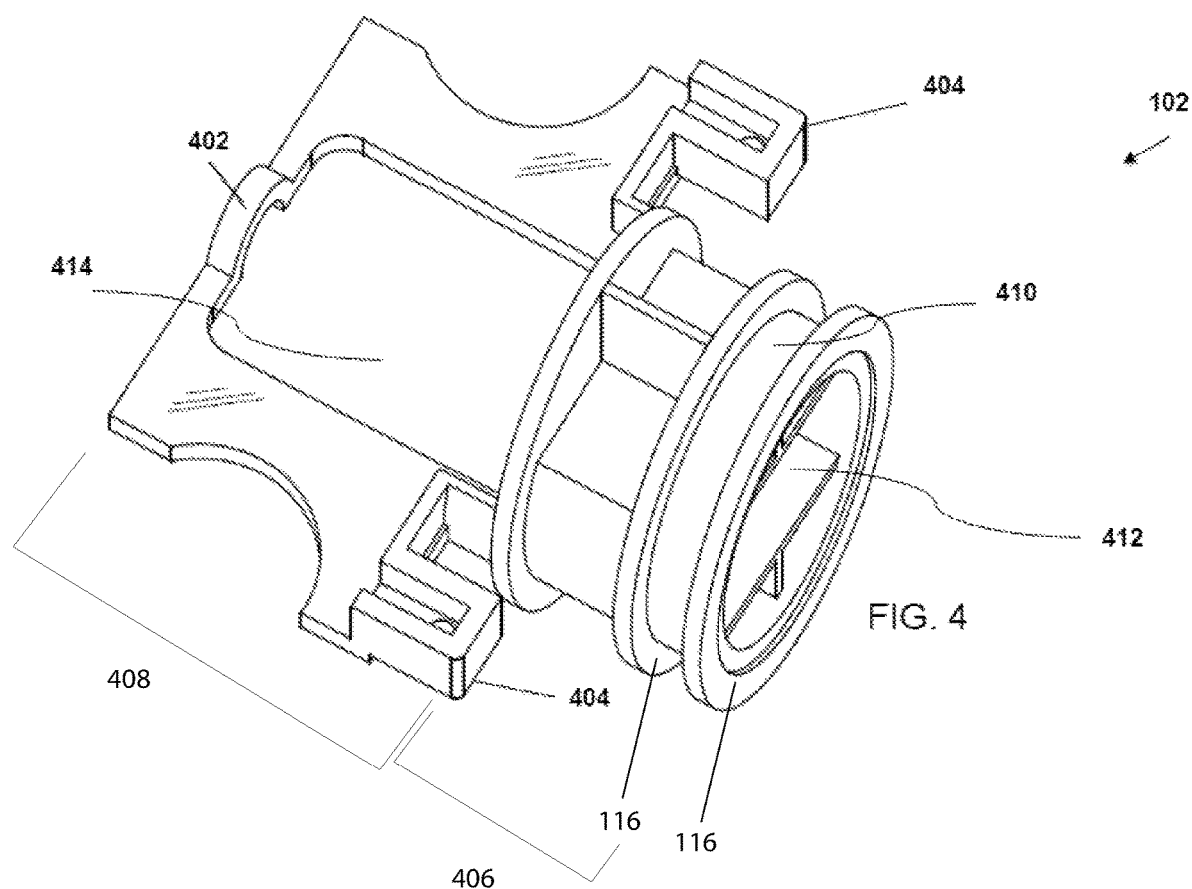
FIG. 4 is a diagram of an O-ring support of the present disclosure.

Referring now to FIG. 4, FIG. 4 is a diagram of O-ring support 102. In some non-limiting embodiments, O-ring support 102 may include planar section 408 and pipe fitting section 406. In some non-limiting embodiments, planar section 408 and pipe fitting section 406 may be formed integrally. For example, planar section 408 and pipe fitting section 406 may be formed as a single piece. In some non-limiting embodiments, O-ring support 102 may be formed via an injection molding process using a rigid polymer, such as PVC. In this way, O-ring support 102 may be formed so that no creep or relaxation occurs and, thus, ensuring that no liquid leaks occur from around an O-ring placed in groove 410 over time. In some non-limiting embodiments, planar section 408 may include cable holding element 402, flanges 404, and aperture 414. In some non-limiting embodiments, cable holding element 402 may have an arch shape to allow for cable 112 to pass along (e.g., through) cable holding element 402. In some non-limiting embodiments, flanges 404 may extend towards pipe fitting section 406 and may include an aperture to allow for a fastening mechanism to be used with flanges 404. In some non-limiting embodiments, aperture 414 of planar section 408 may be sized and configured to allow for a PCB (e.g., PCB 330) to be positioned within aperture 414 of planar section 408. In some non-limiting embodiments, pipe fitting section 406 may include vertical ribs 116, which define groove 410 and channel 412. In some non-limiting embodiments, groove 410 is sized and configured to accept an O-ring (e.g., O-ring 104) therein. In some non-limiting embodiments, groove 410 may have an annular shape. In some non-limiting embodiments, channel 412 is sized and configured to allow a PCB to be positioned within channel 412. For example, a PCB may be positioned within aperture 414 of planar section 408 and extend through channel 412 of pipe fitting section 406. In some non-limiting embodiments, the PCB may be inserted through channel 412 and positioned within aperture 414 and then over-molding material 106 may hold PCB 330 in place. In some non-limiting embodiments, pipe fitting section 406 may have a shape that allows pipe fitting section 406 of O-ring support 102 to fit within a pipe that is intended to carry a liquid. For example, pipe fitting section 406 may have a shape that corresponds to a shape of an interior of a pipe, such as a round (e.g., circular shape), a square shape, a triangular shape, and/or the like.

Figure 5:
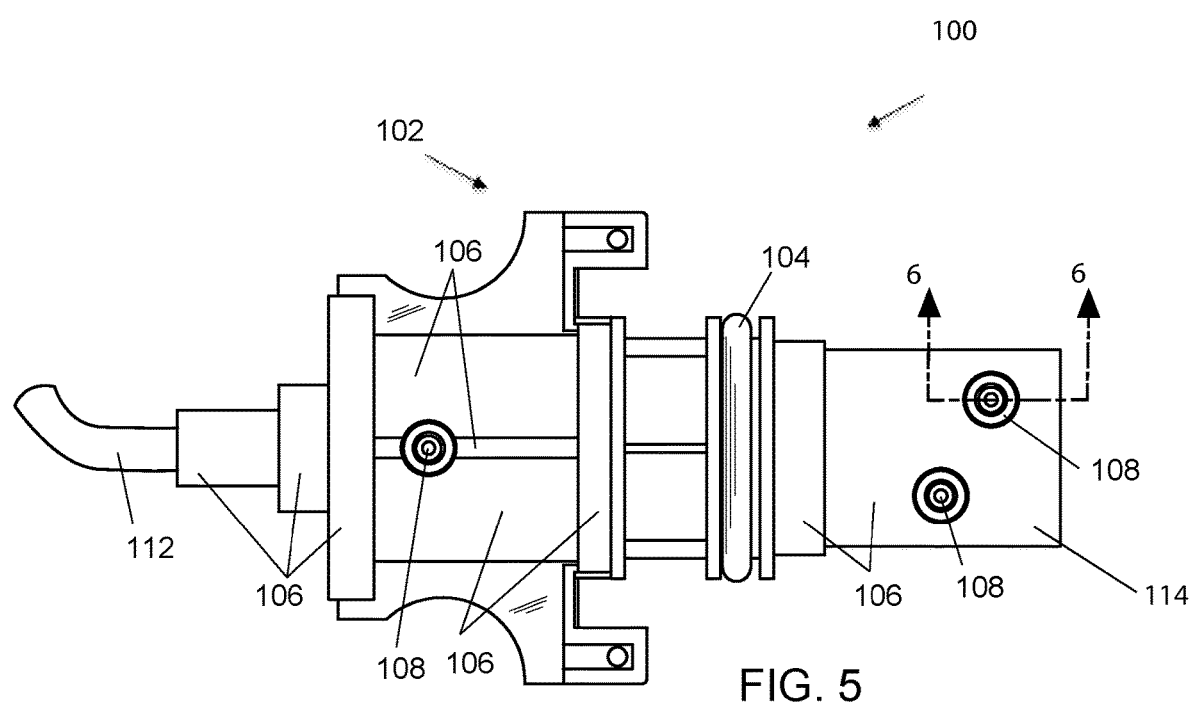
FIG. 5 is a top view of the flow sensor assembly of FIG. 1.
Figure 6:
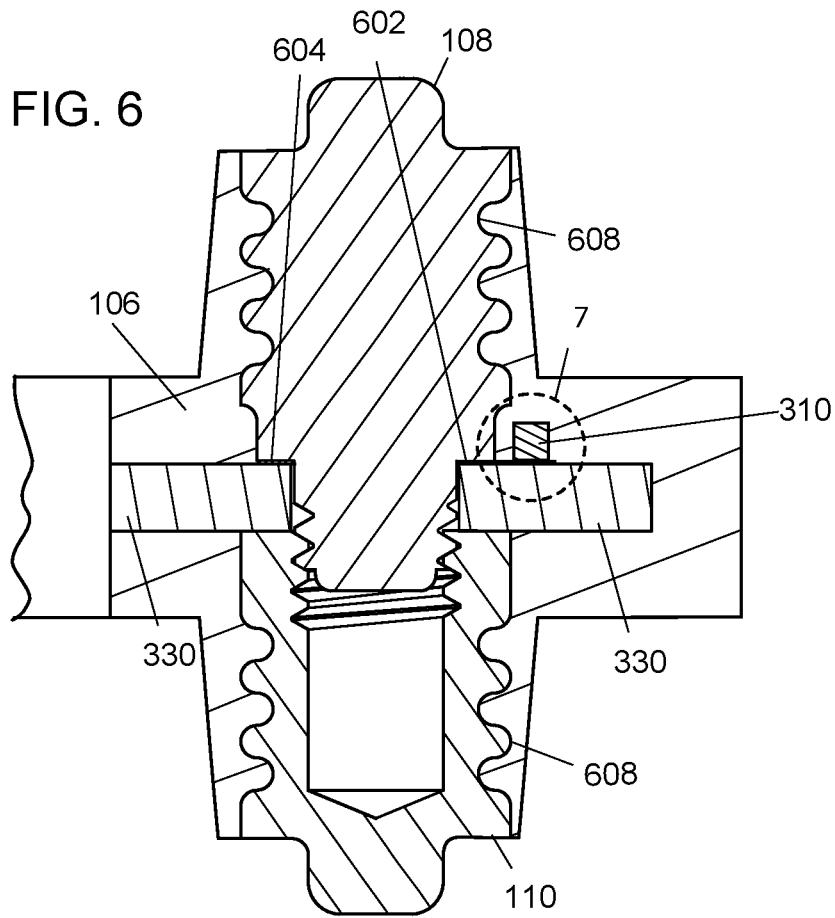
FIG. 6 is a cross-sectional view of sensor pins of the present disclosure.

Referring now to FIG. 6, FIG. 6 is a cross-sectional view of male sensor pin 108 and female sensor pin 110 along line 6-6 of FIG. 5. As shown in FIG. 6, male sensor pin 108 may be coupled with female sensor pin 110. In this way, male sensor pin 108 and female sensor pin 110 may hold PCB 330 and squeeze electrical traces 602, 604 to make intimate thermal contact. In some non-limiting embodiments, electrical traces 602, 604 may be formed on PCB 330 using copper (e.g., bare copper). As further shown in FIG. 6, male sensor pin 108 and/or female sensor pin 110 may be shaped to have an outside diameter with a plurality of grooves 608 (e.g., smooth, round, S-shaped grooves), which may be designed to ensure that over-molding material 106 will bond firmly to male sensor pin 108 and/or female sensor pin 110 and hold male sensor pin 108 and/or female sensor pin 110 tightly during thermal expansion and contraction without introducing stress cracks. In addition, the shape of grooves 608 may also increase a length of any potential leak path (e.g., by almost 60%) to prevent water or other liquid being measured from penetrating flow sensor assembly 100 and flowing into any sensitive (e.g., circuit) components. As further shown in FIG. 6, water temperature response thermistor 310 may be positioned adjacent male sensor pin 108 and/or female sensor pin 110 on top of electrical trace 602. In some non-limiting embodiments, water temperature response thermistor 34 may include a thermistor.

Figure 7:
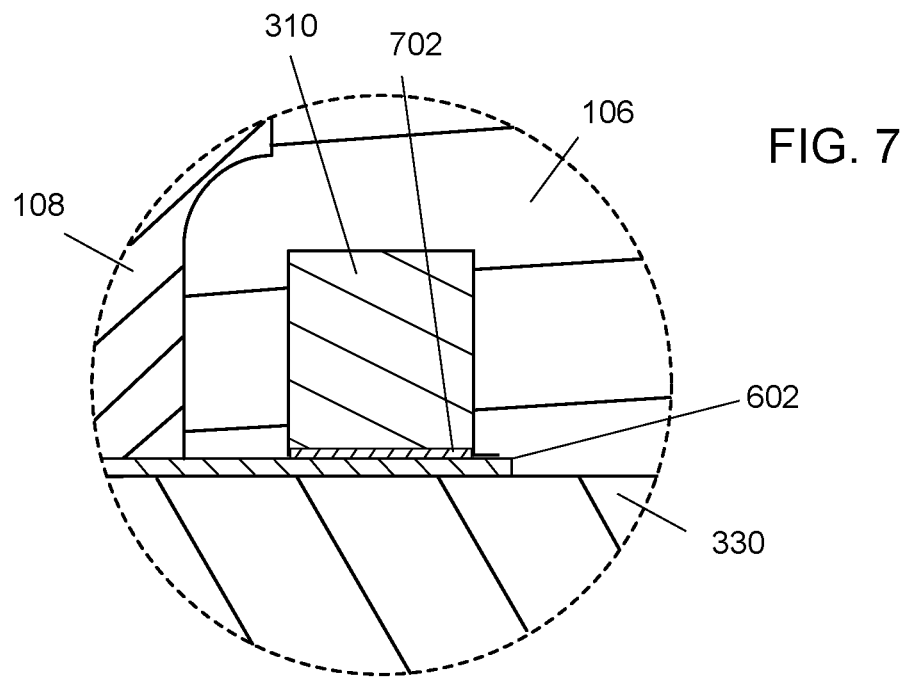
FIG. 7 is an enlarged view of a water temperature response thermistor shown in FIG. 6.

Referring now to FIG. 7, FIG. 7 is an enlarged view of water temperature response thermistor 310 indicated by dashed circle 7 of FIG. 6. As shown in FIG. 7, water temperature response thermistor 310 may be surface mounted on PCB 330. Metal end solder terminals are not shown since they are hidden in over-molding material 106 and they create a gap (e.g., approximately 0.001 inches) underneath water temperature response thermistor 310. In some non-limiting embodiments, the gap may be filled with nonconductive thermal heat transfer paste 702, which rests on electrical trace 602 (e.g., water temperature response electrical trace 602 that is made from bare copper).

Referring now to FIG. 8, FIG. 8 is a diagram of flow sensor PCB assembly 800. As shown in FIG. 8, flow sensor PCB assembly 800 may include PCB 330, which includes components mounted thereto. In some non-limiting embodiments, reference thermistor 315, air temperature thermistor 320, and/or processor 806 may be positioned on (e.g., surface mounted to) PCB 330. Air temperature thermal electrical trace 802 and reference electrical trace 804 may also be positioned on PCB 330. Air temperature thermal electrical trace 802 may be formed around an aperture for a coupling of male sensor pin 108 and corresponding female sensor pin 110 and under air temperature thermistor 320. Reference electrical trace 804 may be formed around an aperture for a coupling of male sensor pin 108 and corresponding female sensor pin 110 and under reference thermistor 315. As further shown in FIG. 8, PCB 330 may include electrical circuit electrical traces 808 that provide electrical connections between circuit components and thermistors 305, 310, 315 that will sense a temperature of a liquid and heating resistor 325. In some non-limiting embodiments, air temperature thermal electrical trace 802, reference electrical trace 804, and/or electrical circuit electrical traces 808 may be formed from copper (e.g., bare copper). In some non-limiting embodiments, a coupling of male sensor pin 108 and corresponding female sensor pin 110 may be positioned in the aperture adjacent air temperature thermal electrical trace 802. The coupling of male sensor pin 108 and corresponding female sensor pin 110 may provide a path for the transfer of heat between air in contact with male sensor pin 108 and female sensor pin 110 and air temperature thermistor 320. In some non-limiting embodiments, a coupling of male sensor pin 108 and corresponding female sensor pin 110 may be positioned in the aperture adjacent reference electrical trace 804. The coupling of male sensor pin 108 and corresponding female sensor pin 110 may provide a path for the transfer of heat between a liquid in contact with male sensor pin 108 and female sensor pin 110 and reference thermistor 315.

Referring now to FIG. 9, FIG. 9 is an enlarged view of a section of flow sensor PCB assembly 800 indicated by dashed circle 9 of FIG. 8. As shown in FIG. 9, each end of thermistors 305, 310 and heating resistor 325 may include solder pads 906, solder 904, and solder mask dam 908. As further shown in FIG. 9, heating electrical trace 604 may run halfway around an aperture for a coupling of male sensor pin 108 and corresponding female sensor pin 110 (not shown) and under self-heating thermistor 305 and under heating resistor 325. In some non-limiting embodiments, water temperature response electrical trace 602 may run half way around the aperture and under reference thermistor 315. In some non-limiting embodiments, gap 902 may thermally separate heating electrical trace 604 from water temperature response electrical trace 602. In this way, no direct heat conduction occurs between heating resistor 325 and self-heating thermistor 305 to water temperature response thermistor 310. In some non-limiting embodiments, water temperature response electrical trace 602 and heating electrical trace 604 may be formed from copper (e.g., bare copper).

In some non-limiting embodiments, the design of electrical traces and gap 902 in electrical traces 602, 604, prevents direct thermal conduction through a conductive copper material between self-heating thermistor 305, heating resistor 325, and water temperature response thermistor 310. Instead, heat from self-heating thermistor 305 and heating resistor 325 may be directed (e.g., forced) to rise away from electrical trace 604 into male sensor pin 108 and female sensor pin 110 (e.g., not shown in FIG. 9) and back down to electrical trace 602 then under water temperature response thermistor 310. Since male sensor pin 108 and female sensor pin 110 may be in direct contact with a liquid, gap 902 may create direct modulation of the heat transferred by the liquid flowing past male sensor pin 108 and female sensor pin 110, in similar fashion to a gate on a transistor.

Referring now to FIG. 10, FIG. 10 is an enlarged view of the section of flow sensor PCB assembly 800 shown in FIG. 9 as indicated by dashed circle 10 of FIG. 9. As shown in FIG. 10, heating resistor 325 may be soldered in position and solder 904 attaching heating resistor 325 to solder pads 906, which are on PCB 330. In some non-limiting embodiments, solder 904 may be prevented from spreading during reflow to heating electrical trace 604 by solder mask dam 908 using industry standard minimum spacing between the mask and pad and heating electrical trace 604 such that gap 1008 between heating electrical trace 604 and solder 904 prevents electrical conduction between heating electrical trace 604 and heating resistor 325. In some non-limiting embodiments, all four of surface mount thermistors 305, 310, 315, 320 and heating resistor 325 may be attached to PCB 330 in this way.

Figure 11:
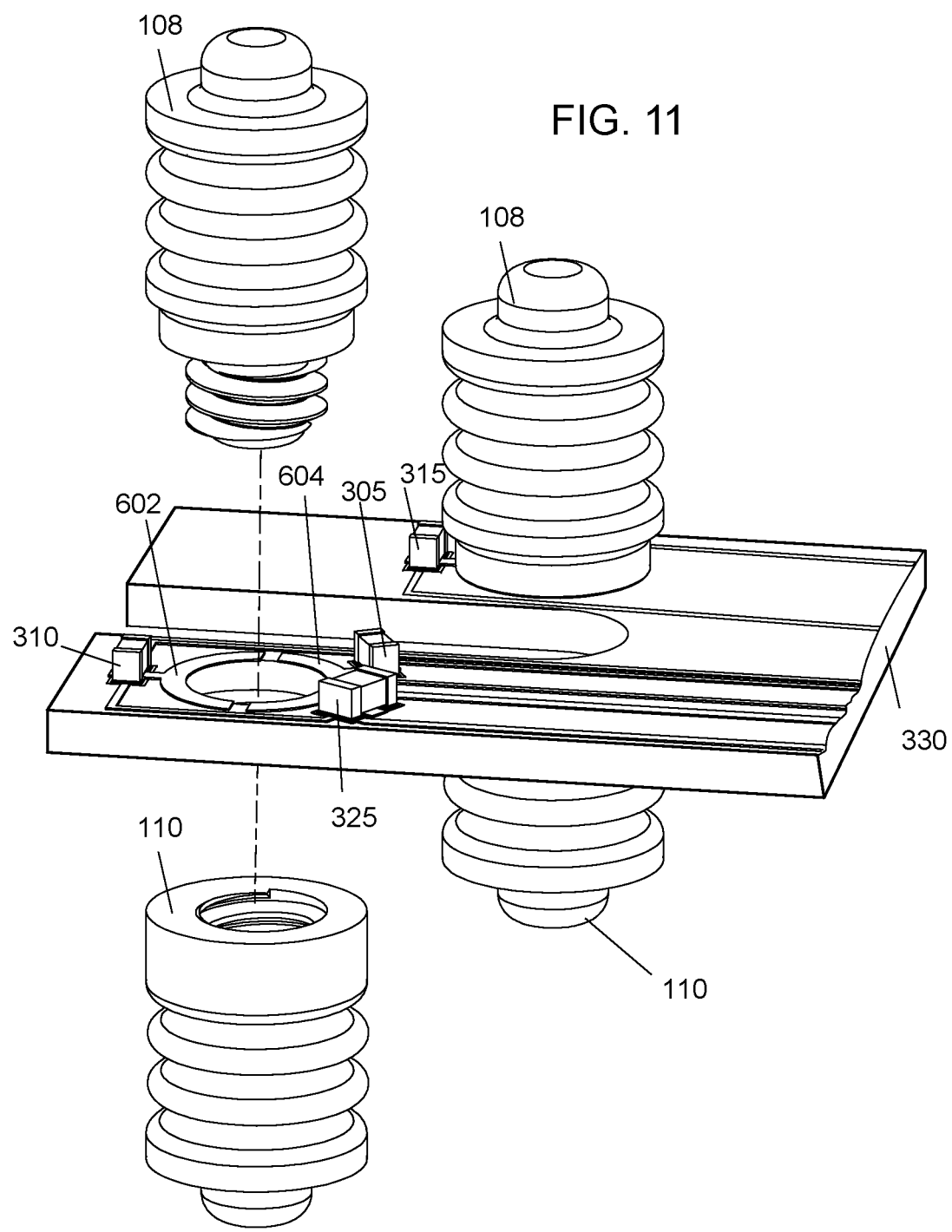
FIG. 11 is an enlarged view of a section of the flow sensor PCB assembly of FIG. 8.

Referring now to FIG. 11, FIG. 11 is an enlarged view of a section of flow sensor PCB assembly 800. As shown in FIG. 11, PCB 330 may include thermistors 305, 310, 315, heating resistor 325, and electrical traces 602, 604. As further shown in FIG. 11, a first coupling of male sensor pin 108 and corresponding female sensor pin 110 are shown to be assembled (e.g., by screwing male sensor pin 108 and corresponding female sensor pin 110 together) through a first aperture in PCB 330. As further shown in FIG. 11, a second coupling of male sensor pin 108 and corresponding female sensor pin 110 are shown as assembled through a second aperture in PCB 330. With the second coupling, male sensor pin 108 and corresponding female sensor pin 110 are shown in an exploded view to illustrate that male sensor pin 108 and corresponding female sensor pin 110 will be in direct thermal contact with electrical traces 602, 604 (e.g., electrical traces 602, 604 made from bare copper) once male sensor pin 108 and corresponding female sensor pin 110 are screwed together. In some non-limiting embodiments, male sensor pin 108 and corresponding female sensor pin 110 may screw together and hold PCB assembly 800, which enables coupling male sensor pin 108 and corresponding female sensor pin 110 to be used as locator and/or holding pins. In some non-limiting embodiments, injection molding tools (e.g., low pressure injection molding tools) may be used to position PCB assembly 800 in a mold of an injection molding tool in a proper alignment, thereby facilitating quality repeatable flexible pic overloading.

Figure 12:
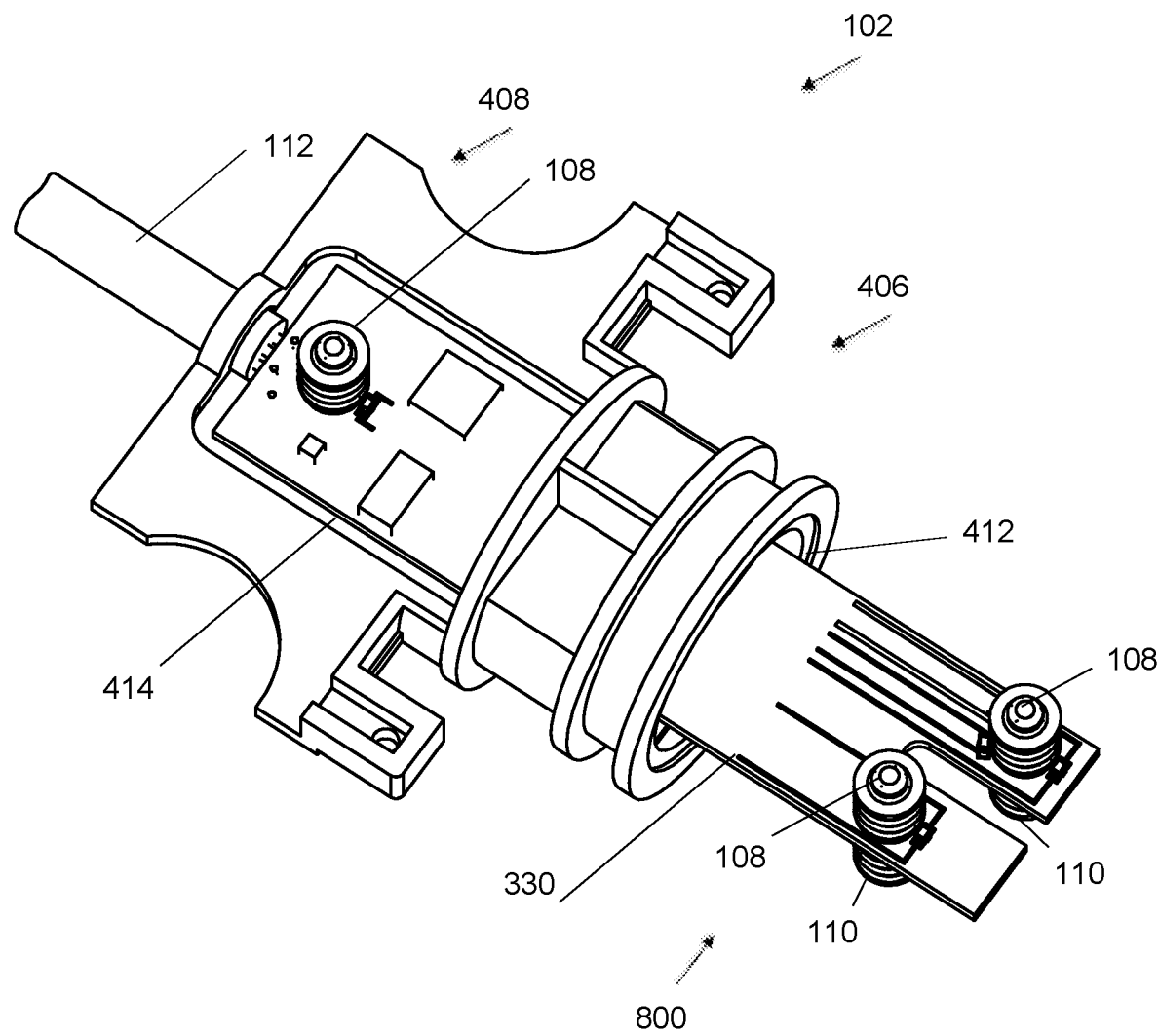
FIG. 12 is a diagram of an O-ring support and a flow sensor PCB assembly of the present disclosure.

Referring now to FIG. 12, FIG. 12 is a diagram of O-ring support 102 and flow sensor PCB assembly 800 assembled together. As shown in FIG. 12, PCB 330 may be positioned within aperture 414 of planar section 408 and extend through channel 412 of pipe fitting section 406. In some non-limiting embodiments, flow sensor PCB assembly 800 and O-ring support 102 may be assembled and placed into over-mold tooling (e.g., so that over-molding material 106 may be applied to O-ring support 102 and flow sensor PCB assembly 800). In some non-limiting embodiments, the over-mold tooling may clamp off of male sensor pins 108 and corresponding female sensor pins 110, and pipe fitting section 406 of O-ring support 102, as well as planar section 408 that holds cable 112 at an end of PCB 330. In some non-limiting embodiments, PCB 330 may be inserted through channel 412 and positioned within aperture 414 and then over-molding material 106 may hold PCB 330 in place.

In some non-limiting embodiments, when the design of O-ring support 102 is ready for over-molding, the design may allow the mold tooling to clamp off on the three sets of male sensor pins 108 and corresponding female sensor pins 110, cable 112, and wires 810 (e.g., which are soldered to PCB 330) and allows over-molding material 106, as over-molding material 106 is injection molded onto O-ring support 102 and flow sensor PCB assembly 800, to flow over cable 112 and through channel 412 of O-ring support 102.

Figure 13:
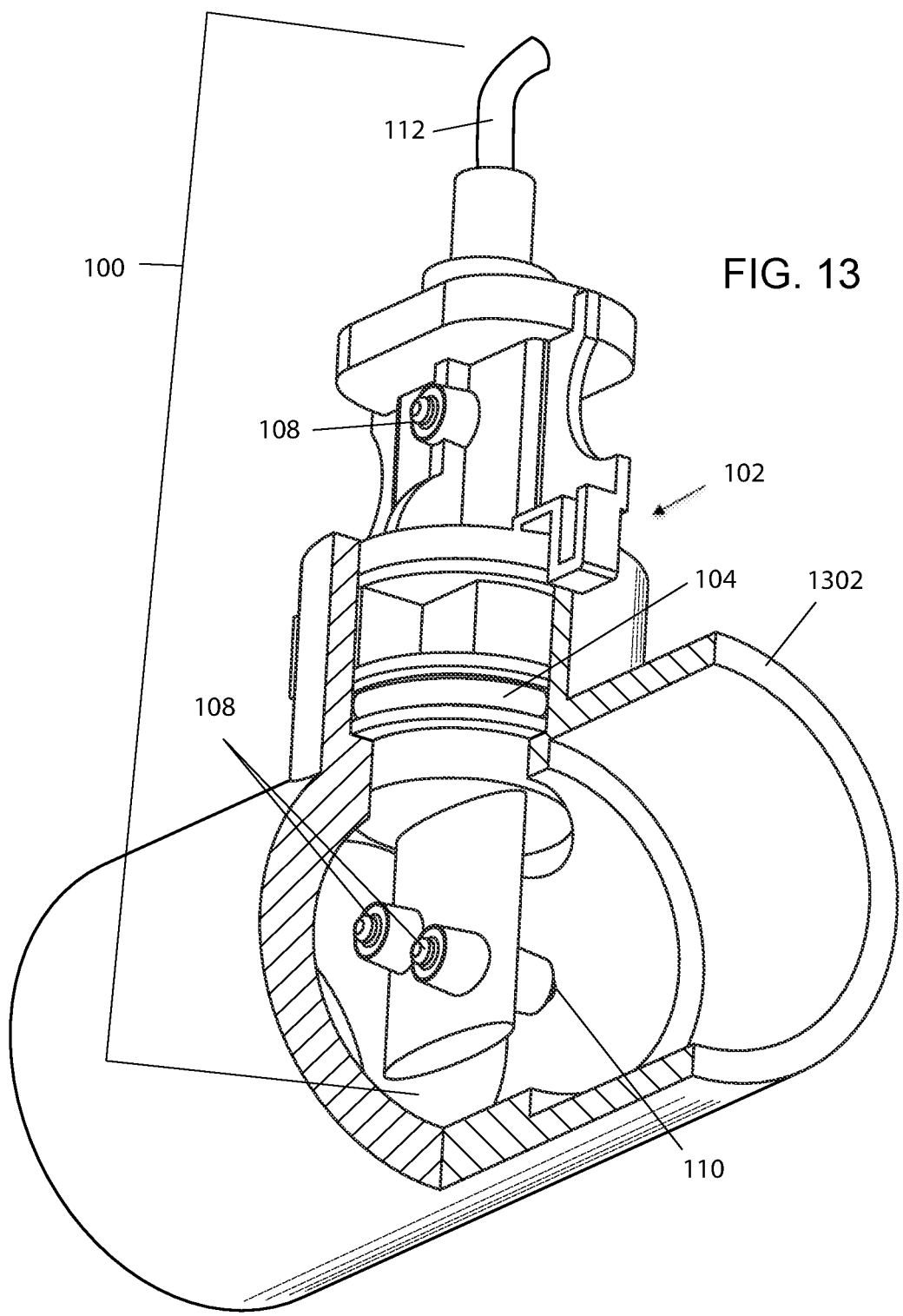
FIG. 13 is a diagram of an installation of a flow sensor assembly positioned within a section of pipe.

Referring now to FIG. 13, FIG. 13 is a diagram of an installation of flow sensor assembly 100 positioned within a section of pipe 1302. As shown in FIG. 13, flow sensor assembly 100 may be inserted into the section of pipe 1302 so that flow sensor assembly 100 is properly orientated to measure a flow (e.g., a flow rate) of a liquid flowing in the section of pipe 1302. In some non-limiting embodiments, the section of pipe 1302 may include a standard 1.5×1.5×1 inch, schedule 40, PVC tee pipe section. As further shown in FIG. 13, O-ring 104 may be positioned in the section of pipe 1302 to ensure that liquid does not leak from the section of pipe 1302. As further shown in FIG. 13, male sensor pins 108 and corresponding female sensor pins 110 (e.g., only one corresponding female sensor pin 110 is shown) may be positioned within section of pipe 1302. For example, two couplings of male sensor pins 108 and corresponding female sensor pins 110 may be positioned in the section of pipe 1302. One coupling of male sensor pin 108 and corresponding female sensor pin 110 may be positioned outside of the section of pipe 1302 and may be exposed to air outside of the section of pipe 1302. As further shown in FIG. 13, cable 112 may extend away from the section of pipe 1302 and connect to another component (e.g., a signal processing device).

As further shown in FIG. 13, a closure system, which is based on and includes O-ring support 102 and O-ring 104, holds flow sensor assembly 100 in place and automatically properly orients flow sensor assembly 100 in the section of pipe 1302 using the two apertures in flanges 404 of (e.g., which may be molded into) O-ring support 102.

Figure 14:
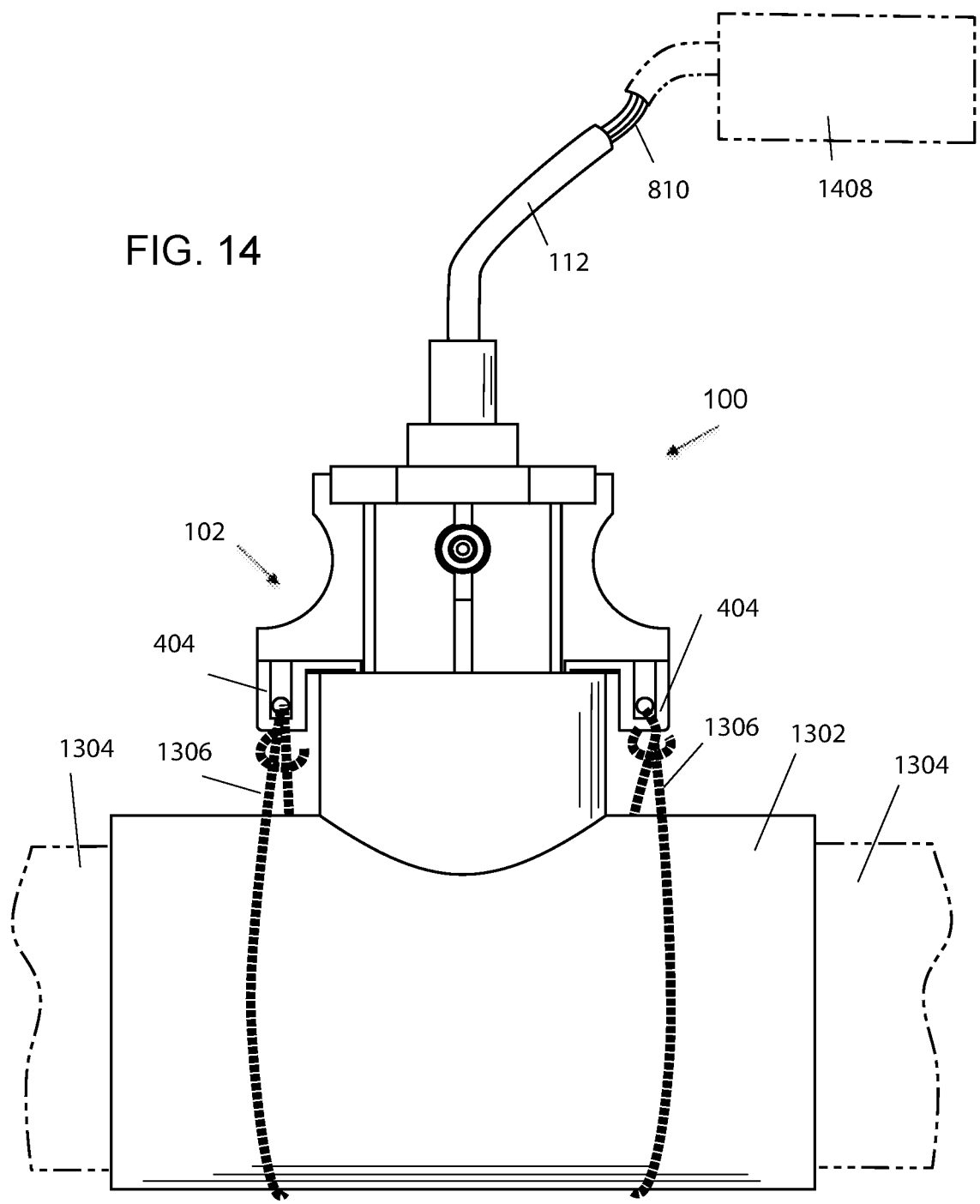
FIG. 14 is a diagram of an installation of a flow sensor assembly positioned within a section of pipe.

Referring now to FIG. 14, FIG. 14 is another diagram of an installation of flow sensor assembly 100 positioned within the section of pipe 1302. As shown in FIG. 14, wires 1306 (e.g., stainless steel hold down wires 1306) may be threaded through the two apertures in flanges 404 of O-ring support 102 and twisted in place so an internal pressure will not cause flow sensor assembly 100 to move out the section of pipe 1302. As further shown in FIG. 14, the section of pipe 1302 may be fit into another pipe 1304 (e.g., a 1.5 inch, schedule 40, PVC pipe) on either end of the section of pipe 1302. As further shown in FIG. 14, cable 112 may include wires 810 (e.g., four wires) that are connected to signal processing device 1408.

When installed in the section of pipe 1302 or in a heat exchanger port of a heating system (e.g., a heat pump), flow sensor assembly 100 may be able to detect the presence of air or water not moving or moving at very low flow rates by comparing a temperature of self-heating thermistor 305 (e.g., which may be in a constantly activated state) with a temperature of reference thermistor 315 and/or a temperature of water temperature response thermistor 310. Based on stabilization, temperature data from static liquid and air, flow sensor assembly 100 may determine whether there is air or static liquid in a pipe or a heat exchanger port. A low flow of liquid, past a coupling of male sensor pin 108 and corresponding female sensor pin 110, may remove some heat and, as the temperature of self-heating thermistor 305 decreases (e.g., drops), which may be verified based on water temperature response thermistor 310, a low flow value may be calculated by processor 806 of flow sensor assembly 100, and an output of the low flow value may be provided by processor 806.

In some non-limiting embodiments, functions of processor 806 and/or signal processing device 1408 may be implemented in hardware, software, or a combination of hardware and software. For example, processor 806 and/or signal processing device 1408 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. In some non-limiting embodiments, processor 806 and/or signal processing device 1408 may include and/or be associated with a memory, which may include random access memory (RAM), read-only memory (ROM), and/or another type of dynamic or static storage device (e.g., flash memory, magnetic memory, optical memory, etc.) that stores information and/or instructions for use by processor 806 and/or signal processing device 1408. The memory may store information and/or software related to the operation and use of processor 806 and/or signal processing device 1408. For example, the memory may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium (e.g., non-transitory computer-readable medium), along with a corresponding drive. A computer-readable medium (e.g., a non-transitory computer-readable medium) may include a non-transitory memory device. A non-transitory memory device may include memory space located inside of a single physical storage device or memory space spread across multiple physical storage devices.

Software instructions may be read into the memory from another computer-readable medium or from another device via a communication interface. When executed, software instructions stored in memory may cause processor 806 and/or signal processing device 1408 to perform one or more functions (e.g., processes, operations, etc.) described herein. Additionally or alternatively, hardwired circuitry may be used in place of or in combination with software instructions to perform one or more functions described herein. Thus, embodiments or aspects described herein are not limited to any specific combination of hardware circuitry and software.

Figure 15:
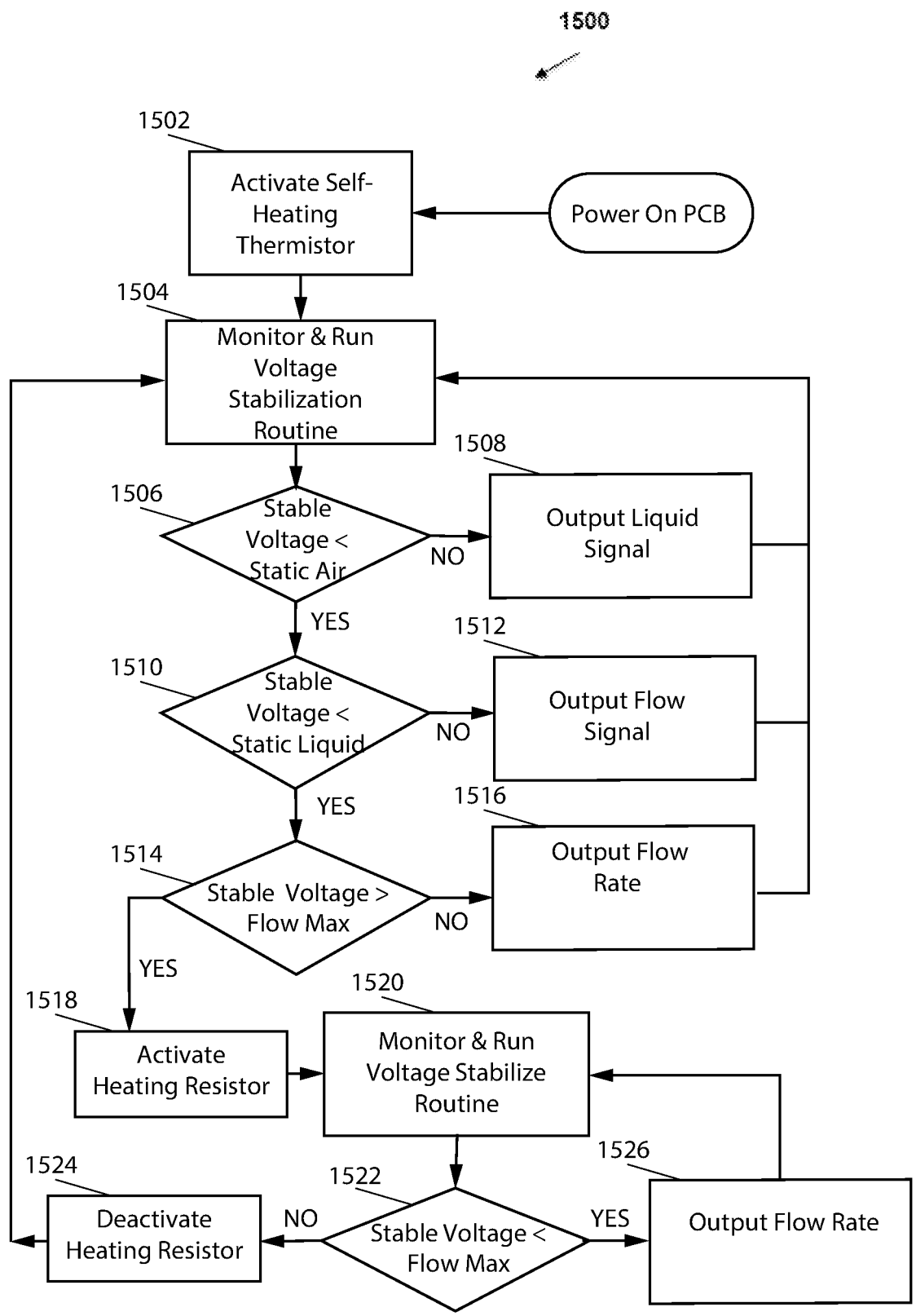
FIG. 15 is a flowchart of a method for detecting flow rates of a fluid.

Referring now to FIG. 15, FIG. 15 is a flowchart of a non-limiting embodiment of a process 1500 for determining a flow rate of a liquid. In some non-limiting embodiments or aspects, one or more of the functions described with respect to process 1500 may be performed (e.g., completely, partially, etc.) by processor 806. In some non-limiting embodiments or aspects, one or more of the steps of process 1500 may be performed (e.g., completely, partially, and/or the like) by another device separate from processor 806, such as signal processing device 1408. In some non-limiting embodiments, measurements of a flow rate of liquid may be used for the liquid using a known accurate flow meter and an intended piping system to correlate the flow rate measured by flow sensor assembly 100 with an actual flow rate. Once the measurements of the flow rate of the liquid are established, data associated with the flow rate will provide the flow rate versus thermistor temperature rise function, which may be used to program the flow sensor assembly 100 and/or an external device (e.g., signal processing device 1408).

As shown in FIG. 15, at step 1502, process 1500 may include activating self-heating thermistor. For example, processor 806 may activate self-heating thermistor 305 based on power being provided to PCB 330. As shown in FIG. 15, at step 1504, process 1500 may include monitoring and running a voltage stabilization routine. For example, processor 806 may monitor a resistance of water temperature response thermistor 310, self-heating thermistor 305, and/or reference thermistor 315 and run the voltage stabilization routine with regard to water temperature response thermistor 310.

As shown in FIG. 15, at step 1506, process 1500 may include determining whether a resistance associated with a stable voltage is less than a resistance associated with static air. For example, processor 806 may compare a resistance of self-heating thermistor 305 and a resistance of water temperature response thermistor 310 (e.g., based on a stable voltage across water temperature response thermistor 310) to a resistance of reference thermistor 315. In some non-limiting embodiments, processor 806 may determine whether a resistance of self-heating thermistor 305 and a resistance of water temperature response thermistor 310 are less than a resistance of reference thermistor 315 that is associated with static air.

As shown in FIG. 15, at step 1508 ("NO"), process 1500 may include outputting a signal associated with a lack of liquid. For example, processor 806 may output a signal (e.g., to signal processing device 1408) associated with a lack of liquid (e.g., "No liquid") based on determining that the resistance of self-heating thermistor 305 and the resistance of water temperature response thermistor 310 are less than the resistance of reference thermistor 315 that is associated with static air. In some non-limiting embodiments, processor 806 may return to step 1504 after outputting the signal associated with a lack of liquid.

As shown in FIG. 15, at step 1510 ("YES"), process 1500 may include determining whether a resistance associated with a stable voltage is less than a resistance associated with static liquid. For example, processor 806 may compare a resistance of self-heating thermistor 305 with a resistance of reference thermistor 315 and a resistance of water temperature response thermistor 310 (e.g., based on a stable voltage across water temperature response thermistor 310) based on determining that the resistance of self-heating thermistor 305 and the resistance of response thermistor 310 are not less than the resistance of reference thermistor 315 that is associated with static air. In some non-limiting embodiments, processor 806 may determine whether a resistance of self-heating thermistor 305 and a resistance of water temperature response thermistor 310 are less than a resistance of reference thermistor 315 that is associated with a static liquid.

As shown in FIG. 15, at step 1512 ("NO"), process 1500 may include outputting a signal associated with a lack of flow. For example, processor 806 may output a signal (e.g., to signal processing device 1408) associated with a lack of flow (e.g., "No flow") based on determining a resistance of self-heating thermistor 305 and a resistance of water temperature response thermistor 310 are less than a resistance of reference thermistor 315 that is associated with a static liquid. In some non-limiting embodiments, processor 806 may return to step 1504 after outputting the signal associated with a lack of flow.

As shown in FIG. 15, at step 1514 ("YES"), process 1500 may include determining whether a resistance associated with a stable voltage is less than a resistance associated with a maximum flow rate. For example, processor 806 may compare a resistance of self-heating thermistor 305 with a resistance of reference thermistor 315 and a resistance of water temperature response thermistor 310 (e.g., based on a stable voltage across water temperature response thermistor 310) based on determining a resistance of self-heating thermistor 305 and a resistance of water temperature response thermistor 310 are not less than a resistance of reference thermistor 315 that is associated with a static liquid. In some non-limiting embodiments, processor 806 may determine whether a resistance of self-heating thermistor 305 and a resistance of water temperature response thermistor 310 are greater than a resistance of reference thermistor 315 that is associated with a maximum flow rate of a liquid.

As shown in FIG. 15, at step 1516 ("NO"), process 1500 may include outputting a signal associated with a flow rate of a liquid. For example, processor 806 may output a signal (e.g., to signal processing device 1408) associated with a flow rate (e.g., "Flow Rate") based on determining that the resistance of self-heating thermistor 305 and the resistance of water temperature response thermistor 310 are not greater than the resistance of reference thermistor 315 that is associated with a maximum flow rate of a liquid. In some non-limiting embodiments, processor 806 may return to step 1504 after outputting the signal associated with the flow rate.

As shown in FIG. 15, at step 1518 ("YES"), process 1500 may include activating a heating resistor. For example, processor 806 may activate heating resistor 325 based on determining that the resistance of self-heating thermistor 305 and the resistance of water temperature response thermistor 310 are greater than the resistance of reference thermistor 315 that is associated with a maximum flow rate of a liquid.

As shown in FIG. 15, at step 1520, process 1500 may include monitoring and running a voltage stabilization routine. For example, processor 806 may monitor self-heating thermistor 305 and reference thermistor 315 and run the voltage stabilization routine with regard to water temperature response thermistor 310 based on activating heating resistor 325. As shown in FIG. 15, at step 1522, process 1500 may include determining whether a resistance associated with a stable voltage is less than a resistance associated with a maximum flow rate. For example, processor 806 may compare a resistance of self-heating thermistor 305 and a resistance of water temperature response thermistor 310 (e.g., based on a stable voltage across water temperature response thermistor 310) to a resistance of reference thermistor 315. In some non-limiting embodiments, processor 806 may determine whether the resistance of self-heating thermistor 305 and the resistance of water temperature response thermistor 310 are less than the resistance of reference thermistor 315 associated with the maximum flow rate.

As shown in FIG. 15, at step 1524 ("NO"), process 1500 may include deactivating the heating resistor. For example, processor 806 may deactivate heating resistor 325 based on determining that the resistance of self-heating thermistor 305 and the resistance of water temperature response thermistor 310 are not less than the resistance of reference thermistor 315 associated with the maximum flow rate. In some non-limiting embodiments, processor 806 may return to step 1504 after deactivating heating resistor 325.

As shown in FIG. 15, at step 1526 ("YES"), process 1500 may include outputting a signal associated with a flow rate of a liquid. For example, processor 806 may output a signal (e.g., to signal processing device 1408) associated with a flow rate (e.g., "Flow Rate") based on determining that the resistance of self-heating thermistor 305 and the resistance of water temperature response thermistor 310 are less than the resistance of reference thermistor 315 associated with the maximum flow rate. In some non-limiting embodiments, processor 806 may return to step 1520 after outputting the signal associated with the flow rate.

Figure 16:
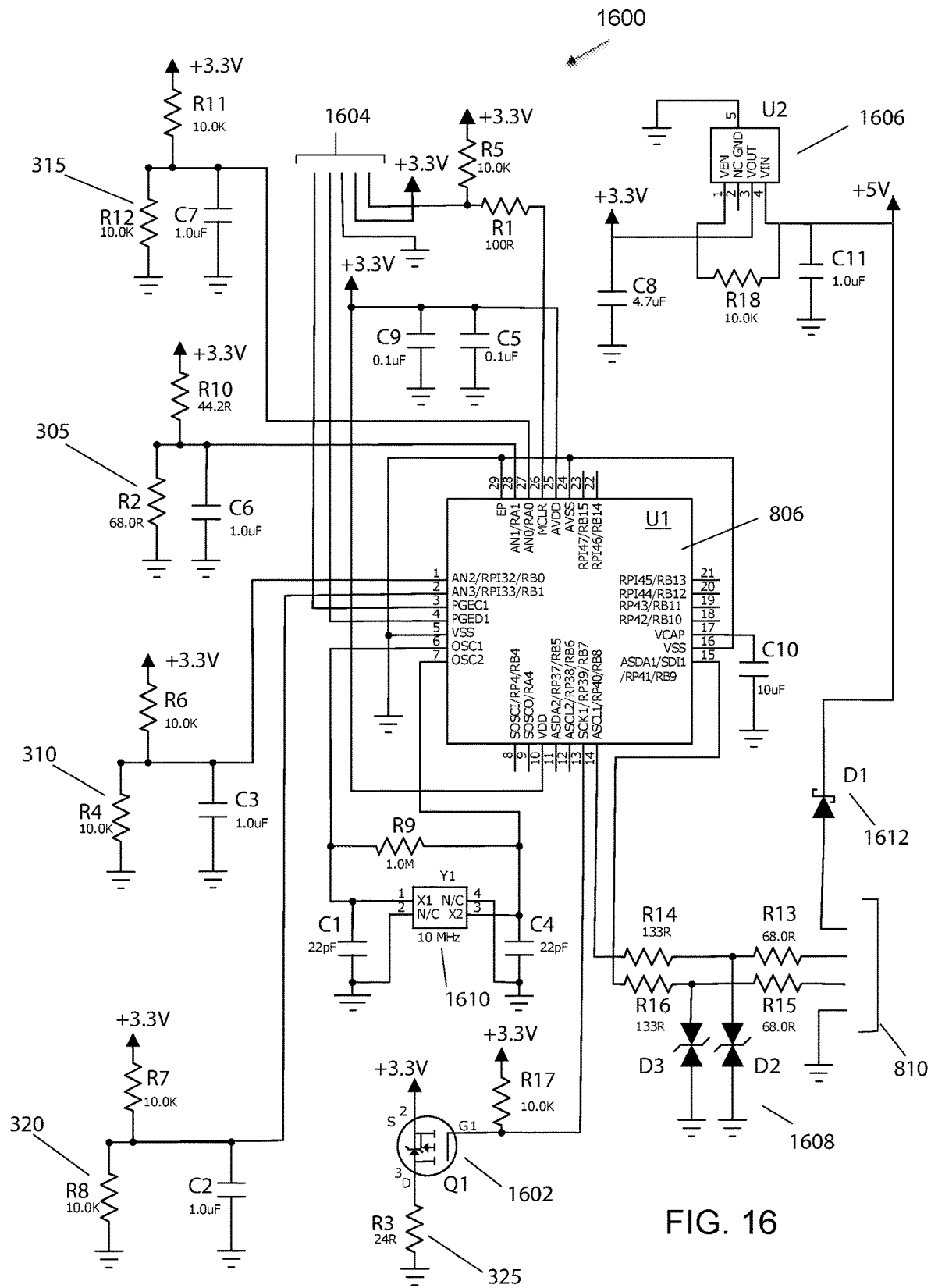
FIG. 16 is a circuit schematic of a circuit of flow sensor assembly that may be used to perform the method of FIG. 15.

Referring now to FIG. 16, FIG. 16 is a circuit schematic of a circuit 1600 of flow sensor assembly 100 that may be used to perform process 1500. As shown in FIG. 16, circuit 1600 may include thermistors 305, 310, 315, 320, and heating resistor 325. As further shown in FIG. 16, circuit 1600 may include voltage regulator 1606, transient/electrostatic protection diode array 1608, crystal oscillator 1610, power metal-oxide-semiconductor field-effect transistor (MOSFET) switching transistor 1602, and Schottky diode 1612, all directly interfaced to processor 806 (e.g., microprocessor 806). As further shown in FIG. 16, circuit 1600 may include common programming header 1604 which is present to load a program for processor 806. As further shown in FIG. 16, circuit 1600 may include power supply and signal wires 810 (e.g., wires 810 of cable 112), which may connect to a signal processing device (e.g., signal processing device 1408).

With regard to the design of flow sensor assembly 100, four surface mount thermistors 305, 310, 315, 320 and other discrete devices, including heating resistor 325, voltage regulator 1606, transient/electrostatic protection diode array 1608, crystal oscillator 1610, power MOSFET switching transistor 1602, and Schottky diode 1612, along with processor 806, as shown in FIG. 16, allow for circuit 1600 to be constructed with a very low cost. The cost of O-ring support 102 is minimal. The small size of sensor pins 108, 110 and the simple design further minimizes cost.

In some non-limiting embodiments, if resistances of self-heating thermistor 305 and water temperature response thermistor 310 are determined to be close to a resistance of reference thermistor 315, this may indicate that a flow rate of a liquid has exceeded a low range, and flow sensor assembly 100 (e.g., processor 806 of flow sensor assembly 100) then activates (e.g., turns on) a voltage of heating resistor 325 using a pulse width modulated signal with an on/off duty cycle, which may be controlled by power switching transistor 1602. The additional heat input may be increased by increasing the duty cycle of the pulse width modulated signal and looping through a voltage stabilization routine until a voltage of water temperature response thermistor 310 stabilizes. The flow rate may then be calculated based on a difference in resistance between thermistors 310, 315. This higher flow rate may be calculated and output by processor 806.

Although the above devices, systems, methods, and computer program products have been described in detail for the purpose of illustration based on what is currently considered to be the most practical and preferred embodiments or aspects, it is to be understood that such detail is solely for that purpose and that the present disclosure is not limited to the described embodiments or aspects but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect.

What is claimed is:

1. A flow sensor assembly for determining flow rate of a liquid, comprising:
    an O-ring support;
    a printed circuit board (PCB) positioned in the O-ring support;
    a plurality of couplings of male sensor pins and female sensor pins;
    a plurality of thermistors associated with the plurality of couplings, wherein each thermistor of the plurality of thermistors are positioned on the PCB and are adjacent to a respective coupling of the plurality of couplings; and
    an over-molding material that holds the PCB in place with regard to the O-ring support.

2. The flow sensor assembly of claim 1, wherein each coupling comprises a male sensor pin made of titanium and a female sensor pin made of titanium.

3. The flow sensor assembly of claim 2, wherein the male sensor pin and the female sensor pin are configured to be coupled together based on a threaded connection.

4. The flow sensor assembly of claim 1, further comprising:
    a heating resistor positioned on the PCB, wherein the heating resistor is soldered in position on the PCB and an amount of solder attaches the heating resistor to a plurality of solder pads that are positioned on the PCB.

5. The flow sensor assembly of claim 1, further comprising:
    a processor positioned on the PCB.

6. The flow sensor assembly of claim 5, further comprising:
    a cable comprising a plurality of wires attached to the PCB; and
    wherein the cable is configured to provide a signal transmission path from the processor to a signal processing device.

7. The flow sensor assembly of claim 1, further comprising:
    a plurality of electrical traces positioned on the PCB, wherein the plurality of electrical traces are formed from copper.

8. The flow sensor assembly of claim 7, wherein the plurality of thermistors comprises a water temperature response thermistor and a self-heating thermistor, and wherein the plurality of electrical traces comprises a water temperature response electrical trace associated with the water temperature response thermistor and a heating electrical trace associated with the self-heating thermistor.

9. The flow sensor assembly of claim 8, wherein a gap is formed between the water temperature response electrical trace associated with the water temperature response thermistor and the heating electrical trace associated with the self-heating thermistor on the PCB, and wherein the gap is configured to prevent direct thermal conduction between the self-heating thermistor and the water temperature response thermistor.

10. A flow sensor assembly for determining flow rate of a liquid, comprising:
    an O-ring support;
    a printed circuit board (PCB) positioned in the O-ring support;
    a heating resistor positioned on the PCB;
    a plurality of couplings of a male sensor pin and a female sensor pin;
    a plurality of thermistors associated with the plurality of couplings, wherein each thermistor of the plurality of thermistors are positioned on the PCB and are adjacent to a respective coupling of the plurality of couplings, and wherein the plurality of thermistors comprises:
        a self-heating thermistor,
        a reference thermistor, and
        a water temperature response thermistor; and
    a processor positioned on the PCB, wherein the processor is programmed or configured to:
        monitor a resistance of the reference thermistor, the self-heating thermistor, and the water temperature response thermistor; and
        run a voltage stabilization routine with regard to the reference thermistor.

11. The flow sensor assembly of claim 10, wherein the processor is programmed or configured to:
    compare the resistance of the self-heating thermistor and the resistance of the water temperature response thermistor to the resistance of the reference thermistor associated with static air; and
    determine whether the resistance of the self-heating thermistor and the resistance of the water temperature response thermistor are less than the resistance of the reference thermistor associated with static air.

12. The flow sensor assembly of claim 11, wherein the processor is programmed or configured to:
  output a signal associated with a lack of liquid based on determining that the resistance of the self-heating thermistor and the resistance of the water temperature response thermistor are less than the resistance of the reference thermistor associated with static air.

13. The flow sensor assembly of claim 10, wherein the processor is programmed or configured to:
  compare the resistance of the self-heating thermistor and the resistance of the water temperature response thermistor to the resistance of the reference thermistor associated with a static liquid; and
  determine whether the resistance of the self-heating thermistor and the resistance of the water temperature response thermistor are less than the resistance of the reference thermistor associated with the static liquid.

14. The flow sensor assembly of claim 13, wherein the processor is programmed or configured to:
  output a signal associated with a lack of flow based on determining that the resistance of the self-heating thermistor and the resistance of the water temperature response thermistor are less than the resistance of the reference thermistor associated with the static liquid.

15. The flow sensor assembly of claim 10, wherein the processor is programmed or configured to:
  compare the resistance of the self-heating thermistor and the resistance of the water temperature response thermistor to the resistance of the reference thermistor associated with a maximum flow rate of a liquid; and
  determine whether the resistance of the self-heating thermistor and the resistance of the water temperature response thermistor are greater than the resistance of the reference thermistor associated with the maximum flow rate of a liquid.

16. The flow sensor assembly of claim 15, wherein the processor is programmed or configured to:
  output a signal associated with a flow rate based on determining that the resistance of the self-heating thermistor and the resistance of the water temperature response thermistor are not greater than the resistance of the reference thermistor associated with the maximum flow rate of a liquid.

17. The flow sensor assembly of claim 10, further comprising:
  an over-molding material that holds the PCB in place with regard to the O-ring support.

18. The flow sensor assembly of claim 10, further comprising:
  a plurality of electrical traces positioned on the PCB, wherein the plurality of electrical traces are formed from copper.

19. The flow sensor assembly of claim 18, wherein the plurality of electrical traces comprises a water temperature response electrical trace associated with the water temperature response thermistor and a heating electrical trace associated with the self-heating thermistor.

20. The flow sensor assembly of claim 19, wherein a gap is formed between the water temperature response electrical trace associated with the water temperature response thermistor and the heating electrical trace associated with the self-heating thermistor on the PCB, wherein the gap is configured to prevent direct thermal conduction between the self-heating thermistor and the water temperature response thermistor.

* * * * *